US012745248B2

(12) United States Patent
Zheng et al.

(10) Patent No.: US 12,745,248 B2
(45) Date of Patent: Sep. 22, 2026

(54) UE MONITORING OCCASIONS WITH IN RRC IDLE AND INACTIVE STATE

(71) Applicant: Nokia Technologies Oy, Espoo (FI)

(72) Inventors: Naizheng Zheng, Beijing (CN); David Navratil, Espoo (FI); Jarkko Tuomo Koskela, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 398 days.

(21) Appl. No.: 18/559,962

(22) PCT Filed: May 11, 2021

(86) PCT No.: PCT/CN2021/093080
§ 371 (c)(1),
(2) Date: Nov. 9, 2023

(87) PCT Pub. No.: WO2022/236687
PCT Pub. Date: Nov. 17, 2022

(65) Prior Publication Data

US 2024/0236989 A1 Jul. 11, 2024

(51) Int. Cl.

| | |
|---|---|
| ***H04W 72/1273*** | (2023.01) |
| ***H04W 56/00*** | (2009.01) |
| ***H04W 72/044*** | (2023.01) |

(52) U.S. Cl.
CPC ... *H04W 72/1273* (2013.01); *H04W 56/0015* (2013.01); *H04W 72/046* (2013.01)

(58) Field of Classification Search
CPC ........... H04W 56/0015; H04W 72/046; H04W 72/1273
See application file for complete search history.

(56) References Cited

U.S. PATENT DOCUMENTS

2014/0119263 A1 5/2014 Shauh et al.
2019/0208570 A1 7/2019 Shrivastava et al.
(Continued)

FOREIGN PATENT DOCUMENTS

CN 110546967 A 12/2019
KR 1020200177524 A 12/2020
(Continued)

OTHER PUBLICATIONS

Extended European Search Report received for corresponding European Patent Application No. 21941262.4, dated Dec. 9, 2024, 9 pages.

(Continued)

*Primary Examiner* — Melanie Jagannathan
(74) *Attorney, Agent, or Firm* — BURR & FORMAN LLP

(57) ABSTRACT

This disclosure presents solutions for allowing a transmitter of multicast broadcast services (MBS) to select a mapping algorithm for mapping synchronization signal block (SSB) beams to slots with PDCCH monitoring occasions (MOs) of a multicast control channel (MCCH) window duration. The transmitter can be a communication node. In some example embodiments, the transmitter can receive assistance information from one or more UEs and utilize that assistance information to determining the mapping algorithm to utilize. The transmitter can determine whether across MCCH window duration mapping is enabled or disabled. The transmitter can determine the pattern of repetition of SSB beams when there are more slots with PDCCH MOs in the MCCH window duration than there are SSB beams in a set of SSB beams where each SSB beam has at least one UE interested at MBS. The SSB beam mapping can be communicated to MBS receivers, allowing them to optimize operations by (Continued)

listening to their respective appropriate monitoring occasions.

12 Claims, 8 Drawing Sheets

(56) References Cited

U.S. PATENT DOCUMENTS

| | | | | |
|---|---|---|---|---|
| 2019/0306737 | A1 | 10/2019 | Kwak et al. | |
| 2020/0053670 | A1 | 2/2020 | Jung et al. | |
| 2020/0092833 | A1 | 3/2020 | Agiwal et al. | |
| 2020/0228190 | A1 | 7/2020 | Cirik et al. | |
| 2020/0404617 | A1 | 12/2020 | Murray et al. | |
| 2021/0037562 | A1 | 2/2021 | Takeda et al. | |
| 2022/0046687 | A1* | 2/2022 | Shrivastava | H04W 72/30 |
| 2022/0132342 | A1* | 4/2022 | Kim | H04L 5/0053 |
| 2022/0183045 | A1* | 6/2022 | Zhang | H04W 72/0446 |
| 2022/0361161 | A1* | 11/2022 | Wei | H04W 72/30 |
| 2022/0394805 | A1* | 12/2022 | Chen | H04W 72/30 |
| 2023/0180247 | A1* | 6/2023 | Zhu | H04L 5/0094 370/329 |
| 2023/0189146 | A1* | 6/2023 | Xin | H04B 7/0695 370/311 |
| 2023/0209485 | A1* | 6/2023 | Wei | H04W 56/0015 370/503 |
| 2023/0224097 | A1* | 7/2023 | Kou | H04L 5/0053 370/329 |
| 2023/0269828 | A1* | 8/2023 | Shrivastava | H04W 76/30 370/312 |
| 2023/0276471 | A1* | 8/2023 | Latheef | H04W 4/06 370/312 |
| 2023/0370905 | A1* | 11/2023 | Babaei | H04W 36/0007 |
| 2024/0049257 | A1* | 2/2024 | Lin | H04W 72/232 |
| 2024/0057100 | A1* | 2/2024 | Agiwal | H04W 4/06 |
| 2024/0267936 | A1* | 8/2024 | Xu | H04W 72/30 |
| 2024/0276519 | A1* | 8/2024 | Lee | H04B 7/0695 |
| 2024/0323959 | A1* | 9/2024 | Sengupta | H04W 4/06 |
| 2025/0023700 | A1* | 1/2025 | Shreevastav | H04L 5/0094 |
| 2025/0184167 | A1* | 6/2025 | Fujishiro | H04W 76/40 |
| 2025/0240789 | A1* | 7/2025 | Shrivastava | H04W 4/06 |

FOREIGN PATENT DOCUMENTS

| | | | |
|---|---|---|---|
| WO | 2020/032868 | A1 | 2/2020 |
| WO | 2021/005663 | A1 | 1/2021 |
| WO | 2021/051318 | A1 | 3/2021 |
| WO | 2022131622 | A1 | 6/2022 |

OTHER PUBLICATIONS

Office action received for corresponding Japanese Patent Application No. 2023-569915, dated Jan. 7, 2025, 3 pages of office action and 7 pages of Summary/translation available.

"Discussion on basic Functions for Broadcast or Multicast for RRC_IDLE or RRC_INACTIVE UEs", 3GPP TSG RAN WG1 #104-e, R1-2100108, Agenda: 8.12.3, ZTE, Jan. 25-Feb. 5, 2021, pp. 1-13.

"Considerations on MBS functions for RRC_IDLE UEs", 3GPP TSG RAN WG1 Meeting #104-e, R1-2100873, Agenda: 8.12.3, Sony, Jan. 25-Feb. 5, 2021, 5 pages.

"Discussion on mechanisms to Support Group Scheduling for RRC_CONNECTED UEs", 3GPP TSG RAN WG1 #104b-e, R1-2102501, Agenda: 8.12.1, ZTE, Apr. 12-20, 2021, pp. 1-12.

"Basic Functions for Broadcast / Multicast for RRC_IDLE / RRC_INACTIVE UEs", 3GPP TSG RAN WG1 Meeting #105-e, R1-2104552, Agenda: 8.12.3, Nokia, May 10-27, 2021, 14 pages.

Office action received for corresponding Indian Patent Application No. 202347084333, dated May 28, 2025, 5 pages.

"3rd Generation Partnership Project; Technical Specification Group Radio Access Network; NR; NR and NG-RAN Overall Description; Stage 2 (Release 16)", 3GPP TS 38.300, V16.5.0, Mar. 2021, pp. 1-151.

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.

"Mechanisms to Support Group Scheduling for RRC_CONNECTED UEs", 3GPP TSG RAN WG1 Meeting #103-e, R1-2008826, Agenda: 8.12.1, ZTE, Oct. 26-Nov. 13, 2020, pp. 1-8.

"3rd Generation Partnership Project; Technical Specification Group Radio Access Network; NR; User Equipment (UE procedures in Idle mode and RRC Inactive state (Release 16)", 3GPP TS 38.304, V16.4.0, Mar. 2021, pp. 1-39.

"Discussion on multicast support for IDLE/INACTIVE UEs", 3GPP TSG RAN WG1 Meeting #104-e, R1-2100191, Agenda: 8.12.3, Huawei, Jan. 25-Feb. 5, 2021, 4 pages.

Li et al., "Power Saving Techniques for 5G and Beyond", IEEE Access, vol. 8, Jun. 9, 2020, pp. 108675-108690.

"Basic Functions for Broadcast / Multicast for RRC_IDLE / RRC_INACTIVE UEs", 3GPP TSG RAN WG1 Meeting #105-e, R1-210XXXX, Agenda: 8.12.3, Nokia, May 10-27, 2021, 13 pages.

"LS on broadcast session delivery and MCCH design", 3GPP TSG-RAN WG2 Meeting #113bis-e, R2-2104639, RAN2, Apr. 12-20, 2021, pp. 1-3.

"3rd Generation Partnership Project; Technical Specification Group Radio Access Network; NR; Physical layer procedures for control (Release 16)", 3GPP TS 38.213, V16.5.0, Mar. 2021, pp. 1-183.

International Search Report and Written Opinion received for corresponding Patent Cooperation Treaty Application No. PCT/CN2021/093080, dated Feb. 11, 2022, 9 pages.

"Beam association for MCCH and MCCH change notification", 3GPP TSG-RAN WG2 Meeting #113 electronic, R2-2101682, Agenda: 8.1.3, Beijing Xiaomi Mobile Software, Jan. 25-Feb. 5, 2021, 3 pages.

"Group Based MBS Notification for Idle/Inactive mode UEs", 3GPP TSG-RAN WG2 Meeting #111 electronic, R2-2007896, Agenda: 8.1.3, MediaTek Inc, Aug. 17-28, 2020, pp. 1-3.

Notice of Allowance received for corresponding Japanese Patent Application No. 2023-569915, dated Oct. 7, 2025, 2 pages of office action and no pages of translation available.

Office action received for corresponding European Patent Application No. 21941262.4, dated Oct. 8, 2025, 7 pages.

* cited by examiner

UE MONITORING OCCASIONS WITH IN RRC IDLE AND INACTIVE STATE

RELATED APPLICATION

This application claims priority to PCT Application No. PCT/CN2021/093080, filed on May 11, 2021, which is incorporated herein by reference in its entirety.

TECHNICAL FIELD

This application is directed, in general, to multicast broadcast services for 3GPP devices and, more specifically, to mapping synchronization signal block beams.

BACKGROUND

In a communication system with a communication node and at least one user equipment (UE), the communication node may need to broadcast a multicast broadcast service (MBS). A beam sweeping mechanism is widely used for common channel transmissions in new radio (NR), such as a synchronization signal block (SSB), system information (SI), and paging, in order to guarantee the coverage requirement. Considering that MBS is supported for RRC_Idle/Inactive UEs in NR, the MBS broadcast messages may be transmitted in the same manner with beam sweeping for RRC_Idle/Inactive UEs. From a power saving perspective, such as for UEs in an RRC_Idle/Inactive state and receiving MBS, the UE may limit its monitoring to the group-common PDCCH associated with its located SSB beams that are transmitted/received at a certain monitoring occasion (MO). In the 3GPP RAN1-104-e meeting, a work item was raised to determine association rules between SSB indexes and UE physical downlink control channel (PDCCH) MOs.

SUMMARY

In a first example embodiment, an apparatus is disclosed. In the example embodiment, the apparatus comprises (1) a transceiver, operable to receive and transmit communication signals with one or more user equipment (UEs), wherein the transceiver is part of a communication node, and (2) a processor, operable to communicate with the transceiver, and to determine a synchronization signal block (SSB) beam mapping to slots with configured physical downlink control channel (PDCCH) monitoring occasions (MOs) of a multicast control channel (MCCH) window duration for a multicast broadcast service (MBS) wherein a first SSB beam in a set of SSB beams is assigned to a first PDCCH MO of the MCCH window duration, a number of SSB beams in the set of SSB beams is greater than one, a number of PDCCH MOs of the MCCH window duration is greater than one, and the one or more UEs are interested at MBS.

In a second example embodiment, an apparatus is disclosed. In the example embodiment, the apparatus comprises (1) a one or more processors, and (2) memory storing instructions and data that, when executed by the one or more processors, cause the apparatus to (1) receive an SSB beam mapping for a MBS window, and (2) process a transmission received from a communication node in a physical downlink control channel (PDCCH) monitoring occasion (MO) specified by the SSB beam mapping, where the communication node determines the SSB beam mapping to slots with configured PDCCH MOs of a window duration of the MBS window, wherein a first SSB beam in a set of SSB beams is assigned to a first PDCCH MO of the MBS window, a number of SSB beams in the set of SSB beams is greater than one, a number of PDCCH MOs in the window duration of the MBS window is greater than one, and the apparatus is interested at MBS.

In a third example embodiment, a method is disclosed. In the example embodiment, the method comprises (1) determining a periodicity of PDCCH MOs and an offset of PDCCH MO for a MCCH window duration for MBS, wherein the MCCH window duration has a set of slots with configured PDCCH MOs, (2) determining a number of PDCCH MOs of the MCCH window duration, (3) determining a subset of SSB beams from a set of SSB beams, wherein each SSB beam in the subset of SSB beams has at least one UE interested at MBS, and (4) generating a mapping of SSB beams to the set of configured PDCCH MOs utilizing the subset of SSB beams, the number of PDCCH MOs, the periodicity of PDCCH MOs, and the offset of PDCCH MO, wherein a first SSB beam is mapped to a first configured PDCCH MO in the set of configured PDCCH MOs of a first MCCH window duration after the offset of PDCCH MO, where the generating is performed by a communication node of a communication system, and the first SSB beam is a first index ordered SSB beam of the subset of SSB beams or a first index ordered SSB beam of the set of SSB beams.

In a fourth example embodiment, a method is disclosed. In the example embodiment, the method comprises (1) determining a set of SSB beams, wherein each SSB beam in the set of SSB beams has at least one UE interested at MBS, (2) determining a repetition algorithm of a repetition across a MCCH window duration, and (3) generating a mapping of the set of SSB beams to a set of configured PDCCH MOs of a MCCH window duration for a MBS utilizing the repetition algorithm, wherein at least one SSB beam in the set of SSB beams is presented within a search space (SS) duration of the MCCH window duration, where the generating is performed by a communication node of a communication system.

In a fifth example embodiment, a method is disclosed. In the example embodiment, the method comprises (1) receiving a SSB beam mapping for an MBS window at a UE, and (2) processing a transmission received from a communication node in a PDCCH MO specified by the SSB beam mapping, where the communication node determines the SSB beam mapping to configured PDCCH MOs of a window duration of the MBS window, wherein a first SSB beam in a set of SSB beams is assigned to a first PDCCH MO of the window duration of the MBS window, a number of SSB beams in the set of SSB beams is greater than one, a number of PDCCH MOs in the window duration of the MBS window is greater than one, and the UE is interested at MBS.

In a sixth example embodiment, a system is disclosed. In the example embodiment, the system comprises (1) a plurality of UEs, capable to transceive communications, to provide a location parameter or a preamble response, and to receive an SSB beam mapping, and (2) a communication node, capable to transceive communications with the plurality of UEs and to determine an SSB beam mapping to configured PDCCH MOs of a MCCH window duration for a MBS, wherein the communication node determines a repetition algorithm of a repetition across the MCCH window duration and a repetition model for SSB beams.

BRIEF DESCRIPTION

Reference is now made to the following descriptions taken in conjunction with the accompanying drawings, in which.

DETAILED DESCRIPTION

Figure 1:
FIG. 1 is an illustration of a diagram of an example communication scenario with a radio access network (RAN) and multiple user equipment (UEs)
Figure 1:
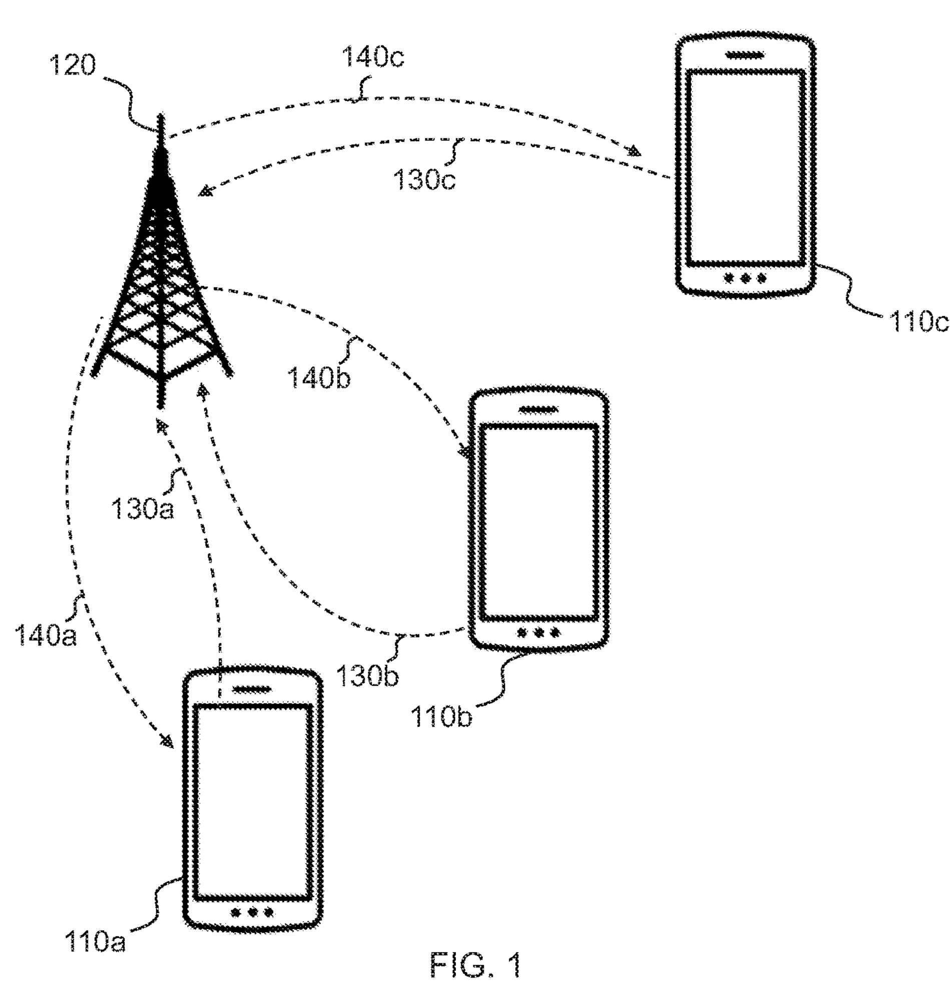

In the 5G third-generation partnership project (3GPP) Release 17 proposed standard, there is a work item based on an agreement in RAN1-104-e entitled, "How to define the PDCCH monitoring occasion associated with each SSB beam for RRC_Idle/Inactive UEs to receive the group-common PDCCH of MBS broadcast services?" for implementing synchronization signal block (SSB) beam mapping to a multicast control channel (MCCH) window. This process is typically done by a communication node. The communication node is capable of performing as a transceiver, e.g., transmit and receive, communications with one or more user equipment (UEs).

UEs, such as mobile phones, tablets, laptops, and other 5G devices whether movable, mobile, or stationary, can establish a communication link with a network device or receive broadcast messages from one or more network devices, where the network devices can be communication nodes. For example, various communication nodes can be a radio access network (RAN) such as a 5G base station (gNB), an evolved universal mobile telecommunications system (UMTS), a terrestrial radio access (E-UTRA), an enhanced 4G eNodeB E-UTRA base station (eNB), e.g., an enhanced Node B, an enhanced gNB (en-gNB), or a next generation eNB (ng-eNB).

As stated in the received LS (R2-2104639, hereafter R2) from RAN2, the MCCH transmission window, MCCH repetition period, MCCH window duration and radio frame/slot offset have been agreed in RAN2 relate to the MCCH scheduling. The RAN2 made assumptions regarding the association between the SSB index and the UE physical downlink control channel (PDCCH) monitoring occasions (MO). For example, R2 assumes PDCCH occasions for MCCH search space are associated with SSBs in a predefined manner so that the UE can receive MCCH scheduling on PDCCH occasions according to its detected SSB. R2 assumes, in case search space #0 is configured for MCCH (if allowed, pending RAN1 decision), the mapping between PDCCH occasions and SSBs is the same as for SIB1. R2 assumes that if common search space other than search space #0 is configured for MCCH (if allowed, pending RAN1 decision), the PDCCH monitoring occasions for MCCH message which are not overlapping with uplink (UL) symbols are sequentially numbered from one in the MCCH transmission window and mapped to SSBs using the similar rule as defined in TS 38.331.

The specified SSB beam mapping rules within the system information (SI) window is specified in TS 38.331. For SI message acquisition, PDCCH MO is determined according to searchSpaceOtherSystemInformation. If searchSpaceOtherSystemInformation is set to zero, PDCCH MO for SI message reception in a SI-window are the same as PDCCH MO for SIB1 where the mapping between PDCCH MO and SSBs is specified in TS 38.213.

If searchSpaceOtherSystemInformation is not set to zero, PDCCH MO for a SI message is determined utilizing a search space indicated by searchSpaceOtherSystemInformation. PDCCH MO for a SI message which is not overlapping with UL symbols (determined according to tdd-UL-DL-ConfigurationCommon) are sequentially numbered from one in the SI window. The $[x \times N+K]^{th}$ PDCCH MO for a SI message in the SI-window corresponds to the $K^{th}$ transmitted SSB, where x=0, 1, . . . X−1, K=1, 2, . . . N, N is the number of actual transmitted SSBs determined according to ssb-PositionsInBurst in SIB1 and X is equal to CEIL (number of PDCCH MO in the SI-window/N). The actual transmitted SSBs are sequentially numbered from one in ascending order of their SSB indexes. The UE assumes that, in the SI window, PDCCH for an SI message is transmitted in at least one PDCCH MO corresponding to each transmitted SSB and thus the selection of SSBs for the reception SI messages is up to UE implementation.

The actual transmitted SSBs are mapped, which are sequentially numbered from one, in ascending order of their SSB indexes. For example, when five SSBs are utilized out of eight SSBs, they can be ordered as SSB #0, SSB #1, SSB #3, SSB #4 and SSB #7. If the configured MCCH window duration is larger than the actual transmitted SSBs, the SSB index mapping will repeat in the MCCH window duration and continue with the ascending SSB index number in the coming MCCH window duration, e.g., at the $2^{nd}$ MCCH window duration. The SSB index may start with a later indexed SSB depending on the slots available in the MCCH window duration, for example, starting with SSB #4 by following the last SSB #3 in the $1^{st}$ MCCH window duration. The result is that the PDCCH MO corresponding to each transmitted SSB may not be evenly distributed among each MCCH window duration. The drawback of existing SS definitions is that they may not be flexible enough to define PDCCH MOs, such as for a duration larger than one slot.

This disclosure presents solutions to allow the MBS transmitter to utilize an algorithm to improve the mapping of SSB beams to the configured PDCCH MOs across the slots of a MCCH window duration. The solutions can allow receivers of the MBS to monitor the slots with configured PDCCH occasions of the MCCH window duration that utilize an SSB beam that the receiver is receiving signals from, while ignoring the other PDCCH occasions associated with other SSB beams. This can reduce power consumption of the receivers. The MBS transmitter can be, for example, a communication node. The receiver can be, for example, a UE. The MCCH window is a set of slots, where within the slots there is the configured set of PDCCH MOs. The MCCH window duration is the length of the MCCH window, or the number of slots configured for MCCH window.

Figure 2A:
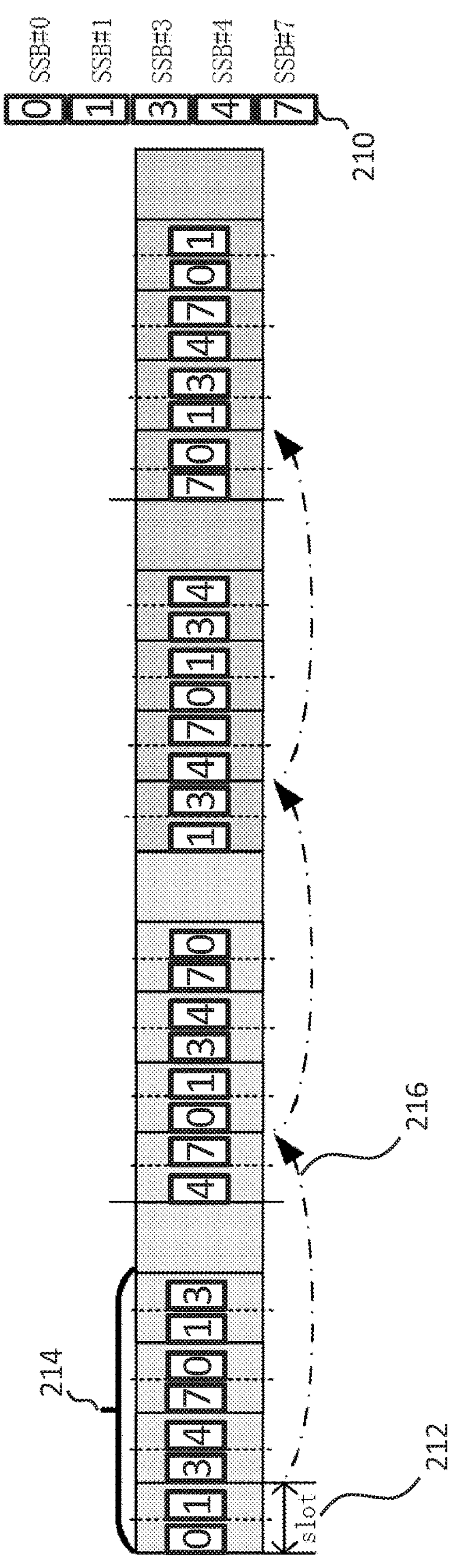
FIG. 2A is an illustration of a diagram of an example multicast control channel (MCCH) window using across MCCH window duration.
Figure 2B:
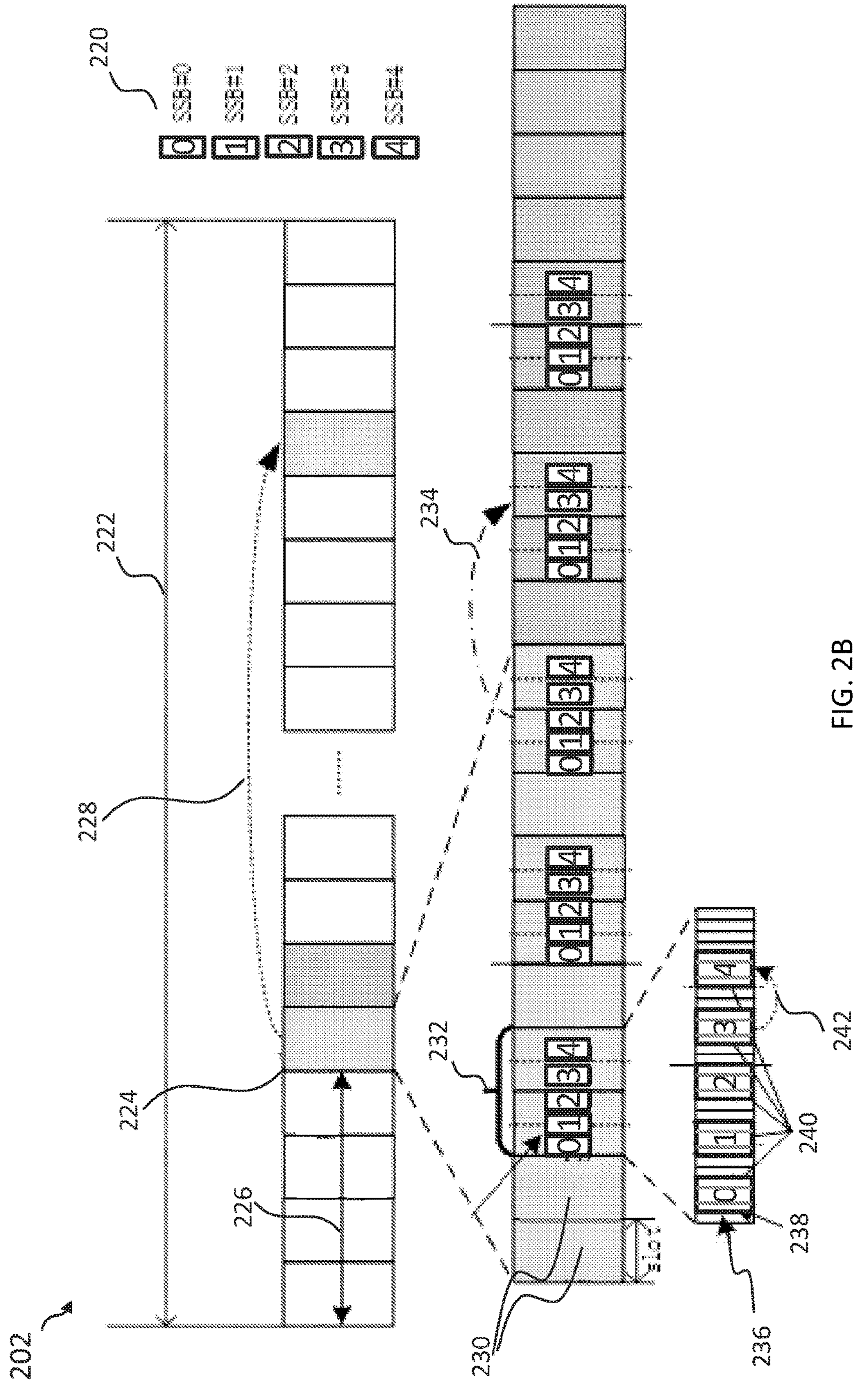
FIG. 2B is an illustration of a diagram of an example MCCH window duration with repeating synchronization signal block (SSB) beams.

In some example embodiments, when the MCCH window duration is larger than one slot, a number of PDCCH MOs can be defined within the slots of a MCCH window duration (see, for example, FIG. 2B). To determine the number of PDCCH MOs, a coreset duration, a periodicity of PDCCH MOs and an offset of PDCCH MO can be determined. The coreset duration defines the number of repeated symbols per PDCCH MO. The offset of PDCCH MO can be the starting symbol offset at the start of the MCCH window duration. The periodicity of PDCCH MOs can be the number of symbols between two PDCCH MOs. The number of SSB beams in the set of SSB beams can be determined as the SSB beams with MBS services. The communication node may determine the SSB beams that have at least one UE interested at MBS, e.g., the determination can utilize an interest indication received from UEs comprising explicit or implicit information about the SSB beam. The set of SSB beams can be repeated within the MCCH window duration, where each set of SSB beams spans one MCCH window duration.

Figure 2C:
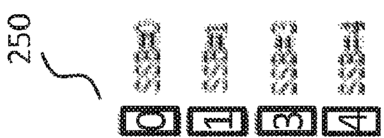
FIG. 2C is an illustration of a diagram of an example MCCH window duration with blank MOs for non-subscribed SSB beams.
Figure 2C:
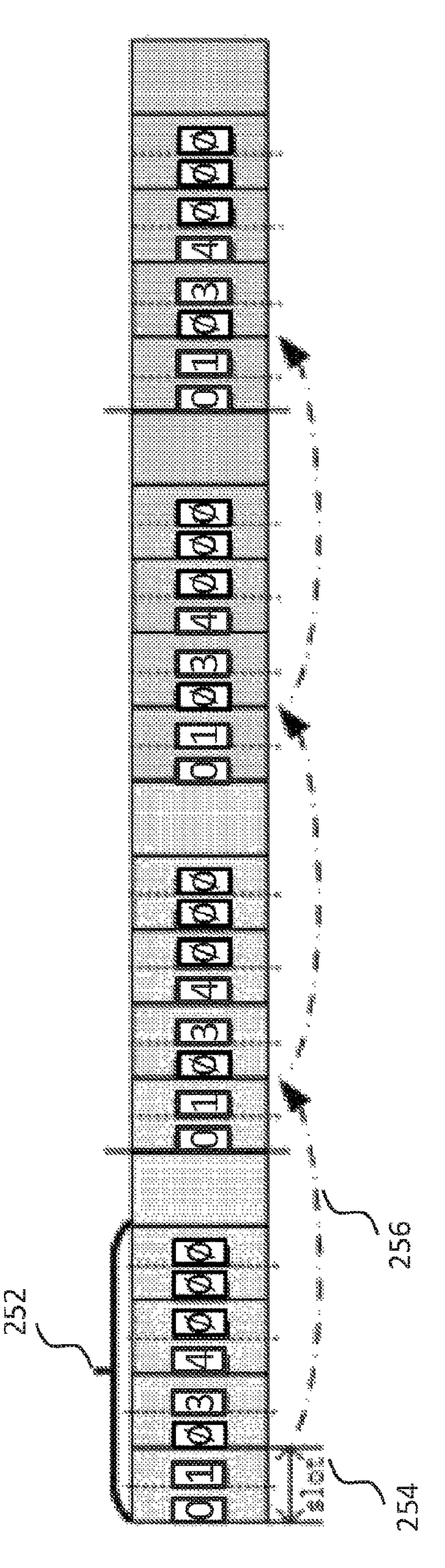

In some example embodiments, when the SSB beam mapping occurs within one MCCH window duration, a set of SSB beams can be generated that includes the indexed ordered SSB beams that have at least one UE interested at MBS and a blank MO, e.g., blank or empty position, for the SSB beams with no UE interested at MBS, e.g., a null, zero, empty set, or any other indication that the SSB beam with the specified index does not have a UE interested at MBS (see, for example, FIG. 2C). For example, a bit map scheme can be utilized to represent the indexed ordered position of the SSB beams. As a demonstration, 11011000 would indicate that SSB beam #0, SSB beam #1, SSB beam #3, and SSB beam #4 should be utilized (they are represented by a '1') as they have UEs interested at MBS, while SSB beam #2, SSB beam #5, SSB beam #6, and SSB beam #7 are not transmitted, e.g., they are represented by a '0'. For SSB beams with no UE interested at MBS, the SSB beam mapping to the MCCH window duration can be blank for the MO. The UE can omit, skip, or otherwise ignore the blank MO. For example, a zero in the bit map indicates that a blank MO is mapped, in the mapping of SSB beams, at an SSB beam indexed order position equivalent to an index order position of the zero in the bit map.

Figure 2D:
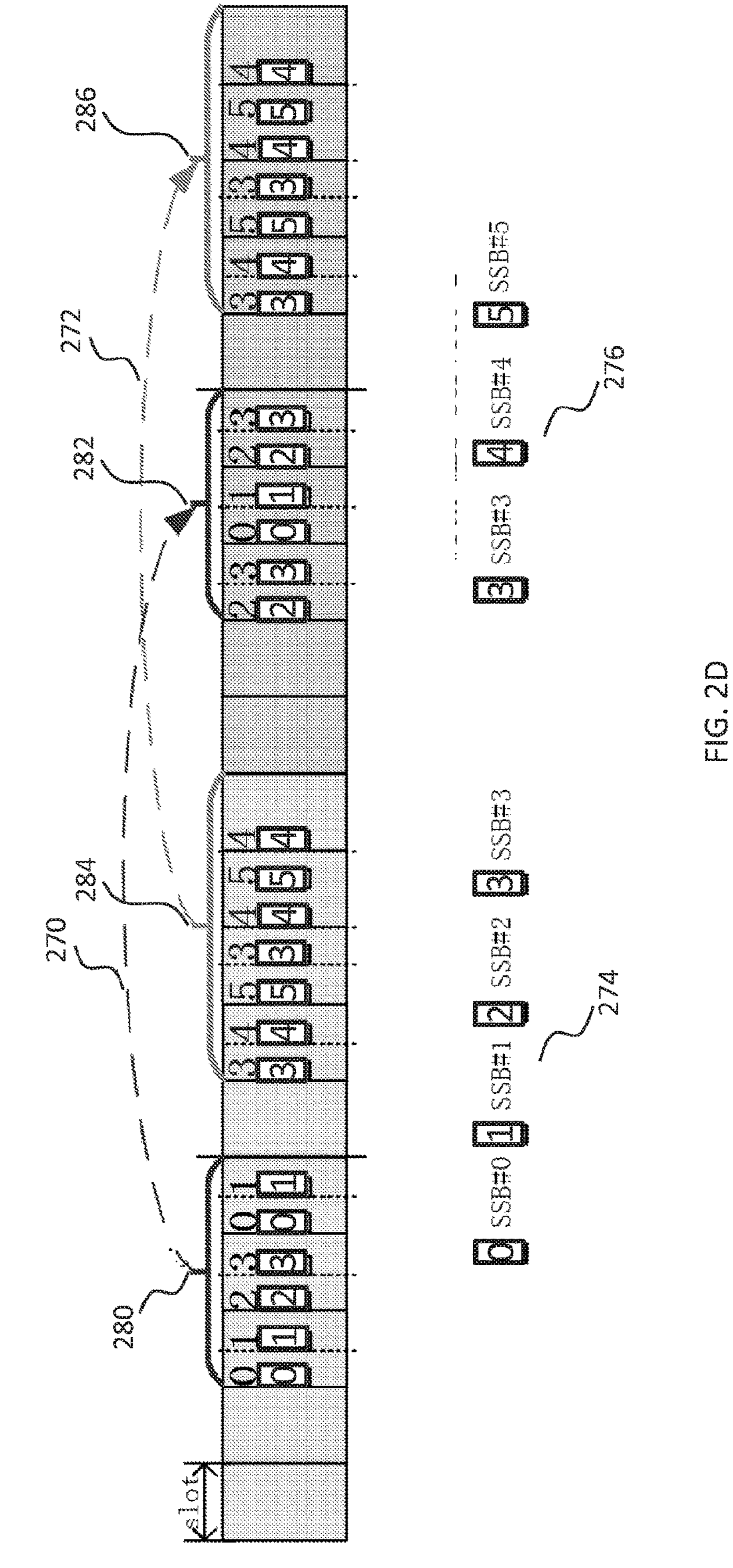
FIG. 2D is an illustration of a diagram of an example multiple MCCH window durations with varying repeating SSB beams.

In some example embodiments, to better control the number of mapped SSB beams to the configured PDCCH MOs within a MCCH window duration by the communication node, the mapping across the MCCH window duration can be disabled by the communication node, meaning that the number of mapped SSB beams can be evenly distributed among each MCCH window duration (see, for example, FIG. 2D). It can be beneficial for the communication node to configure the number of repetition transmissions for each SSB beam within the MCCH window duration. For example, the first SSB Beam in the set of SSB beams that have UEs interested at MBS can align with the first PDCCH MO of the MCCH window duration. In some example embodiments, the SSB beams can be repeated within the MCCH window duration in indexed order.

If the number of configured PDCCH MOs available in the MCCH window duration does not align with the number of SSB beams in the set of SSB beams, then the communication node can utilize various algorithms to determine which SSB beams can be repeatedly mapped to the configured PDDCH MOs of the MCCH window duration. The number of repetitions per SSB beam do not need to be the same. For example, the communication node can utilize a location parameter received from each of the UEs that are UEs interested at MBS, and select an SSB Beam or SSB beams with the furthest UEs to be repeated. This can help the more distant UEs maintain communication consistency. Other algorithms can be utilized, such as selecting SSB beams that are used by UEs at the edge of a cell range of the communication node, utilizing a preamble response from the UEs such as indicating an interest in MBS services, or other assistance information received from the UEs. In some example embodiments, the communication node can utilize the indexed SSB beam order, then repeat the order, if PDCCH MOs remain available. In some example embodiments, after the first indexed order of SSB beams, the remaining PDCCH MOs can be ordered by another algorithm as discussed above.

In some example embodiments, when there can be an SSB beam repetition with an MCCH window duration, the communication node can control the enabling the mapping of SSB beam transmission repetition across or not across the MCCH window duration. The communication node can determine if in the following MCCH window duration, the SSB beam mapping continues with the next ordered index SSB beam in the set of SSB beams, or if the SSB beam mapping restarts with the first SSB beam in the set of SSB beams. In example embodiments where the SSB beam mapping continues with the next ordered index SSB beam, the beam transmission repetition can utilize the PDCCH MO and the SSB index mapping with a reference to the first MCCH window duration.

In some example embodiments, the disclosed solutions can be applied to multicast traffic channel (MTCH) signals. In some example embodiments, full-beam sweeping for MCCH can be implemented, with partial-beam, e.g., a set of SSB beams, sweeping for MTCH, where partial-beam sweeping is one or more of the example embodiments presented in this disclosure. In some example embodiments, partial-beam sweeping can be utilized for MCCH and MTCH, with OSI performing full-beam sweeping to carry the SSB beam mapping modification information, for example, carried in a new system information block. A MCCH signal or a MTCH signal can be referred to as MBS window with a length of an MBS window duration.

An example, for demonstration purposes, of the messaging changes to the 3GPP standard are shown in Table 1. Other messaging changes and different messaging changes can be utilized to implement this disclosure; Table 1 is for example.

TABLE 1

Example messaging to support SSB beam mapping to PDCCH MOs of one or more MCCH window durations.

| Message | Change |
|---|---|
| Message: RRC (UE interest signaling) | Add a field for the UE to indicate interest in MBS and an associated SSB beam, where the associated SSB beam is provided via a PDCCH |
| Message: RRC (Communication node signaling SSB beam mapping schema) | Add a field to indicate the SSB beam mapping schema to allow UEs to react to the appropriate MO |

Turning now to the figures, FIG. 1 is an illustration of a diagram of an example communication scenario 100 with a RAN and multiple UEs. Communication scenario 100 is a demonstration of one type of environment for this disclosure. The environment for communication scenario 100 includes a UE 110*a*, a UE 110*b*, a UE 110*c* (collectively, UEs 110), and a RAN 120. There can be fewer or additional UEs in UEs 110. RAN 120 can be a gNB or other type of communication node.

An example set of messages are shown in communication scenario 100. At a registration time of UE 110*a*, UE 110*a* sends a message 130*a* to RAN 120. Message 130*a* can include one or more UE parameters, such as a location. At registration or at another time of an UL, message 130*a* can include a preamble response, an interest in MBS, or other assistance information of the UE. Likewise, UE 110*b* can send its assistance information through message 130*b* and UE 110*c* can send its assistance information through message 130*c*, (collectively, messages 130). Messages 130 can be RRC messages such as when communicating with RAN 120.

In some example embodiments, RAN 120 can determine a mapping algorithm, e.g., schema, for mapping a set of SSB beams to one or more slots with configured PDCCH MOs of one or more MCCH window durations. In some example embodiments, the information received through messages 130 can be utilized by RAN 120 to determine the mapping algorithm. The mapping algorithm can be transmitted to the UEs 110 using the message 140*a* for UE 110*a*, message 140*b* for 110*b*, and message 140*c* for 110*c* (collectively, messages 140), such as using a system information signal for assistance information. In some example embodiments, messages 140 can be broadcast to the UEs 110 using an MBS window, such a MCCH window or MTCH window. The UEs 110 can utilize the mapping algorithm to determine to which MO each UE should be listening to of the MBS, thereby conserving power and processing time.

FIG. 2A is an illustration of a diagram of an example MCCH window duration 201 using across MCCH window duration. MCCH window duration 201 demonstrates the current standard of behavior and this repeating algorithm, e.g., schema, can continue to be used as one option under this disclosure. MCCH window duration 201 has a SSB beam key 210 indicating the SSB beams with UEs interested at MBS. A slot 212 is indicated, and there are, for this example, four slots for the MCCH window duration 214. The MCCH repetition period, e.g., the repetition of MCCH window duration is shown by scoop arrows 216. The set of SSB beams repeat in order of their index values across each MCCH window duration, wrapping back to the first index when the last index is mapped.

FIG. 2B is an illustration of a diagram of an example MCCH window duration 202 with repeating SSB beams. In one aspect, when the MCCH window duration is larger than one slot, a number of PDCCH MOs can be defined for the MCCH window duration. To determine the number of PDCCH MOs, the coreset duration per PDCCH MO, the periodicity of PDCCH MOs and the offset of PDCCH MO can be determined. The coreset duration defines the number of repeated symbols of a SSB beam per PDCCH MO. The offset of PDCCH MO can be the starting symbol offset at the start of the MCCH window duration. The periodicity of PDCCH MOs can be the number of symbols between two PDCCH MOs. The number of SSB beams in the set of SSB beams can be determined as the SSB beams with MBS services, e.g., has at least one UE interested at MBS. In some example embodiments, the set of SSB beams can include SSB beams that do not have an explicit UE interested at MBS to enable MBS interest of UEs that are able to receive MBS and not registered or subscribed. The set of SSB beams can be repeated within the MCCH window duration, where each set of SSB beams spans one MCCH window duration.

A SSB beam key 220 show SSB beams that have UEs interested at MBS for this example. A radio frame (RF) 222 is the highest level communication unit shown in MCCH window duration 202. A start of MBS 224 is shown after the start RF offset 226. Arc 228 indicates the MBS-RF occurring periodicity. A starting PDCCH MO offset 230 is shown prior to the PDCCH MOs indicated for a MCCH window duration 232. An arc 234 indicates the PDCCH MO periodicity and number of repetitions of each beam transmission. A starting symbol offset 236 and a starting symbol of PDCCH MO 238 are indicated at the lowest breakdown of the communication layer. Elements 240 indicate that each SSB with targeted MBS service can be repeated n number of times, e.g., have a coreset value of 3, in this example, three times, within MCCH window duration 232. Each group of elements 240 is the coreset duration for that respective SSB beam. An arc 242 indicates the symbol periodicity of PDCCH MO within MCCH window duration 232.

FIG. 2C is an illustration of a diagram of an example MCCH window duration 203 with blank MOs for SSB beams with no UEs interested in MBS (non-MBS SSB). In some example embodiments, when the SSB beam mapping occurs within one MCCH window duration, a set of SSB beams can be generated that includes the indexed ordered SSB beams that have at least one UE interested at MBS and a blank MO for the SSB beams with no UE interested at MBS, e.g., a null, zero, empty set, or any other indication that the SSB beam with the specified index does not have a UE interested at MBS. For example, a bit map scheme can be utilized to represent the indexed ordered position of the SSB beams. As a demonstration, 11011000 would indicate that SSB beam #0, SSB beam #1, SSB beam #3, and SSB beam #4 should be utilized (they are represented by a '1') as they have UEs interested at MBS, while SSB beam #2, SSB beam #5, SSB beam #6, and SSB beam #7 are not transmitted, e.g., they are represented by a '0'. For SSB beams with no MBS services, the SSB beam mapping to the MCCH window duration can be blank for the MO. The UE can omit, skip, or otherwise ignore the blank MO. For example, a zero in the bit map indicates that a blank MO is mapped, in the mapping of SSB beams, at an SSB beam indexed order position equivalent to an index order position of the zero in the bit map.

A SSB beam key 250 indicates the set of SSB beams that have at least one UE interested at MBS. A MCCH window duration 252 shows that all SSB beams are represented in their indexed order with the non MBS SSB beam PDCCH MO being left blank or empty. In this example, with 4 PDCCH MOs in MCCH window duration 252 and 8 index positions for the SSB beams, each PDCCH MO is shared by 2 index SSB beam positions. PDCCH MO-1 254 is shown with SSB beam #0 and SSB beam #1. A duration repetition is shown by arc 256.

FIG. 2D is an illustration of a diagram of example multiple MCCH window durations 204 with varying repeating SSB beams. In some example embodiments, to better control the number of mapped SSB beams within a MCCH window duration by the communication node, the mapping across the MCCH window duration can be disabled by the communication node, meaning that the number of mapped SSB beams can be evenly distributed among each MCCH window duration. It can be beneficial for the communication node to configure the number of repetition transmissions for each SSB beam within the MCCH window duration. For example, the first SSB Beam in the set of SSB beams that have UEs interested at MBS can align with the first PDCCH MO of the MCCH window duration. The SSB beams can be repeated within the MCCH window duration in indexed order.

If the number of PDCCH MOs available in the MCCH window duration does not align with the number of SSB beams in the set of SSB beams, then the communication node can utilize various algorithms to determine which SSB beams can be repeated in the one or more extra PDCCH MOs of the MCCH window duration. The number of repetitions per SSB beam do not need to be the same. For example, the communication node can utilize a location parameter received from each of the UEs that are UEs interested at MBS, and select an SSB Beam or SSB beams with the furthest UEs to be repeated. This can help the more distant UEs maintain communication consistency. Other algorithms can be utilized, such as selecting SSB beams that are used by UEs at the edge of a cell range of the communication node, utilizing a preamble response from the UEs such as indicating an interest in MBS services, or other assistance information received from the UEs. In some example embodiments, the communication node can utilize the indexed SSB beam order, then repeat the order, if PDCCH MOs remain available. In some example embodiments, after the first indexed order of SSB beams, the remaining PDCCH MOs can be ordered by another algorithm as discussed above.

There are two MBS services shown in this example, an MBS service 270 and an MBS service 272. MBS service 270 and MBS service 272 do not need to use the same SSB beam mapping algorithm. The communication node can determine the SSB beam mapping algorithm for each MBS transmitted by the communication node. MBS service 270 utilizes a SSB beam key 274 and MBS service 272 utilizes a SSB beam key 276. MBS service 270 has 2 MCCH window durations, a MCCH window duration 280 and a MCCH window duration 282. MBS service 270 is demonstrating an across MCCH window duration enabled mapping algorithm. MBS service 272 has 2 MCCH window durations, a MCCH window duration 284 and a MCCH window duration 286. MBS service 272 is demonstrating a repeating SSB beam mapping with one SSB beam selected to repeat an additional time, such as if the UEs subscribing to that SSB beam are more distant to the communication node than other UEs. The generating of the SSB beam mapping first maps an ordered index of SSB beams in the set of SSB beams followed by an adjusted repetition of the ordered index, where the adjusted repetition of the ordered index is adjusted by the received UE information, e.g., the assistance information.

Figure 3:
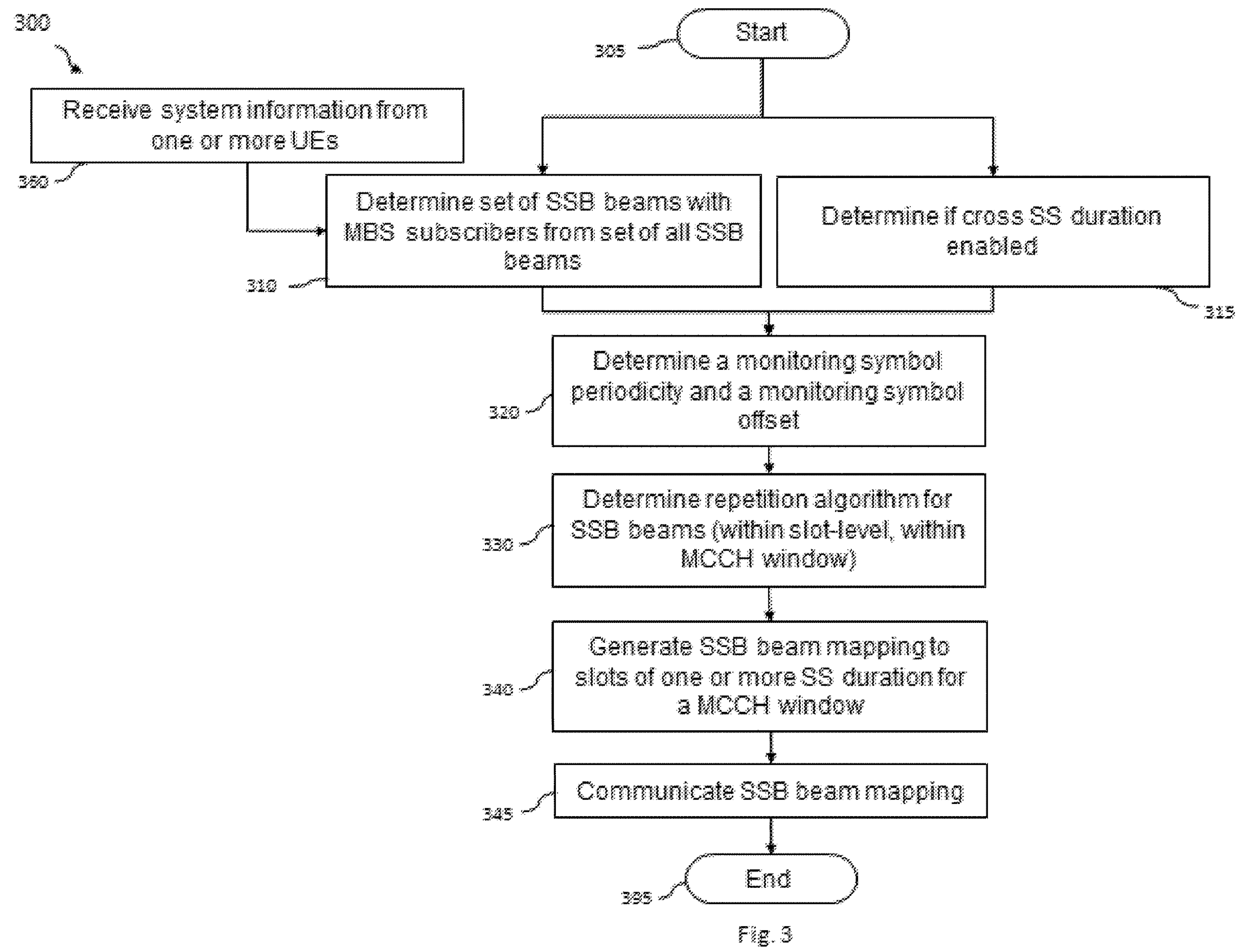
FIG. 3 is an illustration of a flow diagram of an example method to determine an SSB beam mapping to slots with configured physical downlink control channel (PDCCH) monitoring occasions (Mos) of a MCCH window duration.

FIG. 3 is an illustration of a flow diagram of an example method 300 to determine an SSB beam mapping to PDCCH MOs of a MCCH window duration. Method 300 can be performed by a communication node. In some example embodiments, assistance information from one or more UEs can be received by the communication node within the cell of the communication node. Method 300 can be performed at a trigger event, for example, when a UE registers with the communication node, when a UE leaves the cell area of the communication node, when a change is made to the set of SSB beams, or after a specified SSB beam mapping time interval. Method 300 can be performed, for example, wholly or in part, by communication scenario 100 of FIG. 1, by communication system 400 of FIG. 4, or by SSB beam mapping controller 500 of FIG. 5.

Method 300 begins at a step 305 and proceeds to a step 310 and a step 315. Step 310 and step 315 can be performed in various orders, including serially, in parallel, or partially in parallel/partially serially. In a step 310, a determination can be made of a set of SSB beams that have at least one UE interested at MBS, where this set of SSB beams is a subset of the set of all SSB beams of the communication node. The sets can be equivalent. The set of SSB beams can be empty, in which case no MBS is needed for this radio frame. In step 315, a determination can be made on whether across MCCH window duration mapping should be enabled or disabled Method 300 proceeds to a step 320 after step 310 and step 315 have completed. In step 320, a determination can be made on the periodicity of PDCCH MOs and the offset of PDCCH MO. By default, the periodicity of PDCCH MOs can be set to one.

In a step 330, a determination can be made using the outputs of step 310, step 315, and step 320 to select a repetition algorithm, e.g., a repetition state, for SSB beam mapping to PDCCH MOs of a MCCH window duration. The repetition algorithm can allow repetition, where the repetitions can utilize various types of repetition states and patterns, e.g., a repetition model. The repetition algorithm can disallow repetition where the SSB beams are represented once per MCCH window duration. The algorithms can utilize repetition at the PDCCH MOs, at the MCCH window duration level, or a combination thereof. For example, a repetitions per SSB beam can be the number of repetitions of each SSB beam within one MCCH window duration.

In a step 340, a SSB beam mapping to PDCCH MOs of one or more MCCH window durations can be generated. The SSB beam mapping can be utilized by a communication node when transmitting MBS. In some example embodiments, method 300 proceeds to a step 395 when the SSB beam mapping is not communicated to UEs. In some example embodiments, method 300 proceeds to a step 345 when the SSB beam mapping is communicated to UEs. In step 345, the SSB beam mapping can be communicated to one or more UEs within the cell of the communication node so that the one or more UEs can listen at the MOs that interest the respective UE thereby saving processing power and time. Method 300 proceeds to step 395. In step 395, method 300 ends.

A step 360 is an optional step. In example embodiments implementing step 360, assistance information can be received from one or more UEs. The assistance information can include a location, a preamble response, an MBS request or indication, or other UE information that can be utilized to determine the set of SSB beams with UEs interested at MBS. In some example embodiments, the assistance information can be communicated to step 330 where some of the assistance information, such as location or whether a UE is at a cell edge of the communication node, can be utilized to determine the repetition algorithm. For example, for a UE at a distant location, its MBS SSB beam can be repeated more often than other SSB beams to increase overall reliability and consistency of the MBS.

Figure 4:
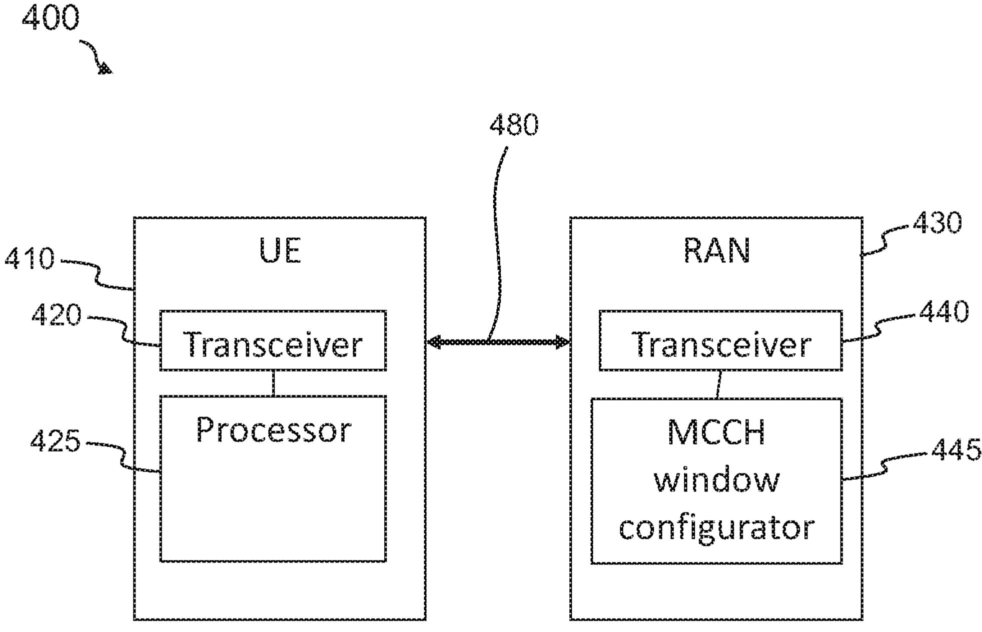
FIG. 4 is an illustration of a block diagram of an example communication system using a mapped SSB beam to PDDCH MOs of a MCCH window duration.

FIG. 4 is an illustration of a block diagram of an example communication system 400 using a mapped SSB beam to PDCCH MOs of a MCCH window duration. Communication system 400 is an example system and could have additional communication nodes and additional UEs. Communication system 400 can implement the disclosed solutions, such as method 300 of FIG. 3 and implement the SSB beam mapping controller 500 of FIG. 5. Communication system 400 has a UE 410 and a communication node 430, shown as a RAN in this example.

UE 410 has a transceiver 420 capable of receiving communication signals and transmitting communication signals with communication node 430 using signal connection 480, for example, sending assistance information, or receiving a SSB beam mapping or a MBS. UE 410 has a processor 425, which can control operations of UE 410, can collect and transmit the assistance information, and can utilize received SSB beam mapping to determine which MOs to listen to of a MCCH window duration.

Communication node 430 has a transceiver 440 capable of receiving communication signals and transmitting communication signals with UE 410 using signal connection 480. Communication node 430 has a MCCH window configurator 445 that is capable of analyzing the received assistance information, such as received from UE 410. MCCH window configurator 445 is capable of generating an SSB beam mapping to PDCCH MOs of a MCCH window duration, for example, the algorithm described in method 300 of FIG. 3. Communication node 430 can communicate the SSB beam mapping to UE 410.

The elements of UE 410 and communication node 430 are shown as a functional view, where the implementation can be by software, hardware, or a combination thereof. In some example embodiments, the functions shown can be combined with other functions of the respective UE 410 or communication node 430.

Figure 5:
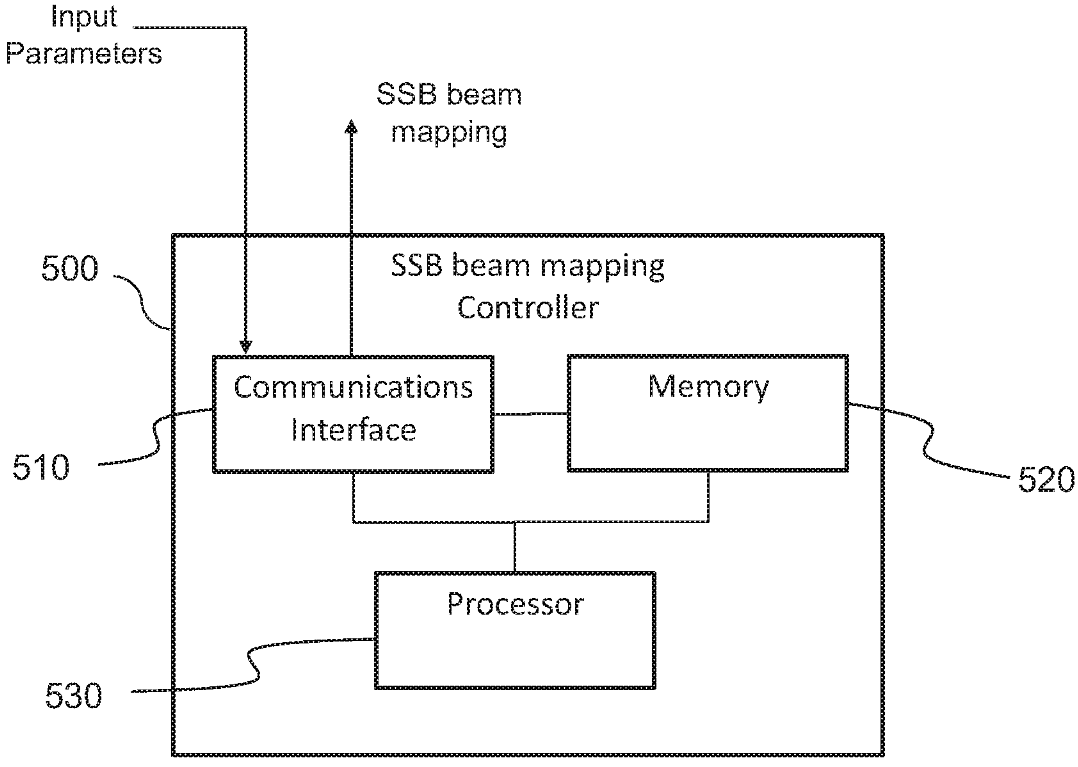
FIG. 5 is an illustration of a block diagram of an example of a SSB beam mapping controller according to the principles of the disclosure.

FIG. 5 is an illustration of a block diagram of an example of SSB beam mapping controller 500 according to the principles of the disclosure. SSB beam mapping controller 500 can be stored on a single computer or on multiple computers. The various components of SSB beam mapping controller 500 can communicate via wireless or wired conventional connections. A portion or a whole of SSB beam mapping controller 500 can be located as part of a RAN and other portions of SSB beam mapping controller 500 can be located as part of a UE communicating with the RAN. SSB beam mapping controller 500 can be virtual or partially virtual while hosted on another system or process.

SSB beam mapping controller 500 can be configured to perform the various methods disclosed herein including receiving assistance information from UEs as input parameters. The various functions performed can be an execution of the methods and processes described herein, such as method 300 of FIG. 3. SSB beam mapping controller 500 can implement communication system 400 of FIG. 4. SSB beam mapping controller 500 includes a communications interface 510, a memory 520, and a processor 530.

Communications interface 510 is configured to transmit data and receive data, e.g., capable to transceive communications. For example, communications interface 510 can receive the assistance information from one or more UEs, such as a location, a preamble response, an MBS indicator, and other assistance information of the UE. Communications interface 510 can transmit the SSB beam mapping and other generated results. Communications interface 510 can communicate via communication systems used in the industry. For example, wireless or wired protocols can be used. Communication interface 510 is capable of performing the operations as described for transceiver 440 of FIG. 4.

Memory 520 can be configured to store a series of operating instructions that direct the operation of processor 530 when initiated, including the code representing the algorithms for generating the SSB beam mapping, as well as data, parameters, and other information. Memory 520 is a non-transitory computer readable medium. Multiple types of memory can be used for data storage and memory 520 can be distributed.

Processor 530 can be configured to determine the various parameters of the method, for example, the set of SSB beams with UEs interested at MBS, whether across MCCH window duration mapping is enabled, the periodicity and offset of the monitoring symbols, and other parameters. For example, in some example embodiments, processor 530 can perform an analysis of received assistance information from the UEs to determine which SSB beams should be repeated more often than other SSB beams within a MCCH window duration. Processor 530 can be configured to direct the operation of the SSB beam mapping controller 500. Processor 530 includes the logic to communicate with communications interface 510 and memory 520, and perform the methods described herein to generate the SSB beam mappings. Processor 530 is capable of performing or directing the operations as described by MCCH window configurator 445 of FIG. 4.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple, or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions, and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Each of the example embodiments as described in the SUMMARY section can have one or more of the following additional elements in combination. Element 1: wherein each SSB beam in the set of SSB beams has at least one UE interested at MBS and the number of SSB beams is greater than the number of PDCCH MOs, and the processor is further operable to determine a subset of SSB beams of the set of SSB beams assigned to each respective PDCCH MO of the MCCH window duration. Element 2: wherein each SSB beam in the set of SSB beams has at least one UE interested at MBS and the number of SSB beams is less than the number of PDCCH MOs, and the processor is further operable to determine one or more of SSB beams in the set of SSB beams that are repeated in the PDCCH MOs of the MCCH window duration. Element 3: wherein the processor utilizes a location of the one or more UEs to determine the one or more SSB beams. Element 4: wherein the processor utilizes a received preamble from the one or more UEs to determine the one or more SSB beams. Element 5: wherein at least one SSB beam in the set of SSB beams has zero UEs interested at MBS and each SSB beam in the set of SSB beams is mapped to the PDCCH MOs of the MCCH window duration, where an indexed order of the at least one SSB beam is mapped using a blank MO in the SSB mapping. Element 6: wherein the number of SSB beams is greater than the number of PDCCH MOs and the processor is further operable to determine a subset of SSB beams of the set of SSB beams assigned to each respective PDCCH MO of the MCCH window duration. Element 7: wherein the number of SSB beams is less than the number of PDCCH MOs and the processor is further operable to determine one or more of SSB beams in the set of SSB beams to be repeated in the PDCCH MOs of the MCCH window duration. Element 8: wherein the processor is further operable to transmit the SSB beam mapping to the one or more UEs. Element 9: wherein the number of SSB beams is equal to the number of PDCCH MOs of the MCCH window duration and the processor is further operable to distribute the set of SSB beams to respective PDCCH MOs of the MCCH window duration. Element 10: wherein the processor is further operable to generate a new SSB beam mapping to the PDCCH MOs of the MCCH window duration when a number of UEs in the one or more UEs changes, when a change is made to the set of SSB beams, or after a specified SSB beam mapping time interval. Element 11: wherein the processor is further operable to determine the SSB beam mapping utilizing a periodicity of PDCCH MOs for a MTCH window duration, an offset of PDCCH MO for the MTCH window duration, a number of PDCCH MOs of the MTCH window duration, and the subset of SSB beams includes at least one UE interested at MTCH. Element 12: wherein the SSB beam mapping is a first SSB beam mapping and the set of SSB beams is a first set of SSB beams, and the processor is further operable to determine a second SSB beam mapping to PDCCH MOs of a MTCH window duration for MBS wherein a first index ordered SSB beam in a second set of SSB beams is assigned to a first PDCCH MO of the MTCH window duration, wherein the second SSB beam mapping utilizes the second set of SSB beams. Element 13: wherein the first set of SSB beams or the second set of SSB beams includes one or more SSB beams with explicit MBS interest and one or more SSB beams with no explicit MBS interest. Element 14: wherein the instructions further cause the apparatus to transmit assistance information to the communication node, and determining of the SSB beam mapping utilizes the assistance information. Element 15: wherein the MBS window duration is a MCCH window duration or a MTCH window duration. Element 16: where the SSB beam mapping is a first SSB beam mapping for a MCCH signal, and a second SSB beam mapping for a MTCH signal is received, the transmission is a first transmission, the PDCCH MO is a first PDCCH MO, and a second transmission is received from the communication node in a second PDDCH MO specified by the second SSB beam mapping. Element 17: communicating the mapping of SSB beams to one or more UEs, where the one or more UEs are interested at MBS of the communication node. Element 18: wherein the number of SSB beams is greater than the number of PDCCH MOs, and each respective PDCCH MO of the MCCH window duration has a respective subset of SSB beams. Element 19: wherein the number of SSB beams is less than the number of PDCCH MOs, and one or more SSB beams in the subset of SSB beams is repeated in the PDCCH MOs of the MCCH window duration. Element 20: wherein a received preamble from the at least one UE is utilized to determine the one or more SSB beams. Element 21: wherein at least one SSB beam in the set of SSB beams has zero UEs interested at MBS and each SSB beam in the set of SSB beams is mapped to the PDCCH MOs of the MCCH window duration, where an indexed order of the at least one SSB beam is mapped using a blank MO in the mapping of SSB beams. Element 22: wherein a number of SSB beams in the subset of SSB beams is greater than the number of PDCCH MOs and each PDCCH MO of the MCCH window duration utilizes a respective subset of SSB beams of the set of SSB beams. Element 23: wherein the number of SSB beams in the subset of SSB beams is less than the number of PDCCH MOs and one or more SSB beams in the subset of SSB beams are repeated in the PDCCH MOs of the MCCH window duration. Element 24: wherein a number of SSB beams in the subset of SSB beams is equal to the number of PDCCH MOs of the MCCH window duration and the set of SSB beams is distributed to PDCCH MOs of the MCCH window duration. Element 25: wherein a new SSB beam mapping to the PDCCH MOs of the MCCH window duration is generated when a number of UEs in the at least one UE changes, when a change is made to the subset of SSB beams, or after a specified SSB beam mapping time interval. Element 26: wherein the generating further comprises determining a number of SSB beams mapped to each configured PDCCH MO of the set of configured PDCCH MOs. Element 27: wherein the subset of SSB beams is represented by a bit map, where a zero in the bit map indicates that a blank MO is mapped, in the mapping of SSB beams, at an SSB beam indexed order position equivalent to an index order position of the zero in the bit map. Element 28: wherein the first SSB beam is a first SSB beam of the set of SSB beams, and the generating further utilizes the set of SSB beams. Element 29: wherein the generating the mapping of SSB beams further utilizes a periodicity of PDCCH MOs for a MTCH window duration, an offset of PDCCH MO for the MTCH window duration, a number of PDCCH MOs of the MTCH window duration, and the subset of SSB beams includes at least one UE interested at MTCH. Element 30: wherein the mapping of SSB beams is a first mapping of SSB beams and the subset of SSB beams is a first subset of SSB beams, and a second mapping of SSB beams to PDCCH MOs of a MTCH window duration for the MBS is determined, wherein a first indexed ordered SSB beam in a second subset of SSB beams is assigned to a first PDCCH MO of the MTCH window duration, wherein the second mapping of SSB beams utilizes the second subset of SSB beams. Element 31: wherein the first subset of SSB beams or the second subset of SSB beams includes one or more SSB beams with explicit MBS interest and one or more SSB beams with no explicit MBS interest. Element 32: wherein the repetition algorithm allows repetition and the generating further utilizes a PDCCH MO and a SSB index mapping, where the SSB index mapping indicates a first SSB beam to be mapped from the set of SSB beams, and setting the SSB index mapping to a next SSB beam in the set of SSB beams after the MCCH window duration has been filled, where the next SSB beam after a last indexed SSB beam in the set of SSB beams is a first indexed SSB beam. Element 33: wherein the repetition algorithm disallows repetition and each SSB beam in the set of SSB beams is repeated with a same number of instances within the MCCH window duration. Element 34: wherein the repetition algorithm disallows repetition and a number of SSB beams in the set of SSB beams is less than a number of PDCCH MOs in the MCCH window duration, where the generating first maps an ordered index of SSB beams in the set of SSB beams followed by an adjusted repetition of the ordered index of SSB beams, where the adjusted repetition of the ordered index of SSB beams is adjusted by received UE information. Element 35: wherein the UE information is one or more of a UE location indicated in a UE preamble response. Element 36: wherein the mapping of SSB beams is a first mapping of SSB beams and the set of SSB beams is a first set of SSB beams, and a second mapping of SSB beams to PDCCH MOs of a MTCH window duration for MBS is determined, wherein a first SSB beam in a second set of SSB beams is assigned to a first PDCCH MO of the MTCH window duration, wherein the second mapping of SSB beams utilizes the second set of SSB beams. Element 37: wherein the first set of SSB beams includes one or more SSB beams with explicit MBS interest and one or more SSB beams with no explicit MBS interest. Element 38: transmitting assistance information to the communication node, and determining of the SSB beam mapping utilizes the assistance information. Element 39: wherein the MBS window duration is a MCCH window duration or a MTCH window duration. Element 40: where the SSB beam mapping is a first SSB beam mapping for a MCCH signal, and a second SSB beam mapping for a MTCH signal is received, the transmission is a first transmission, the PDCCH MO is a first PDCCH MO, and a second transmission is received from the communication node in a second PDDCH MO specified by the second SSB beam mapping. Element 41: wherein the communication node utilizes at least one received location parameter or at least one received preamble response to determine the repetition model. Element 42: wherein the communication node utilizes a periodicity of PDCCH MOs, an offset of PDCCH MO, a number of PDCCH MOs, and a set of SSB beams with MBS services to determine the repetition model. Element 43: wherein the SSB beam mapping utilizes a blank MO for a PDCCH MO for SSB beams where the plurality of UEs are not interested at MBS. Element 44: wherein the communication node inserts a blank MO in an indexed ordered position of the SSB beam mapping for one or more SSB beams that have no UE interest at MBS. Element 45: wherein the communication node is one of a gNB, an UMTS, a E-UTRA, an eNB, an en-gNB, or a ng-eNB.

What is claimed is:

1. An apparatus, comprising:

at least one processor; and at least one memory storing instructions that, when executed by the at least one processor, cause the apparatus at least to:

receive and transmit communication signals with one or more user equipment (UE);

determine a synchronization signal block (SSB) beam mapping to slots with configured physical downlink control channel (PDCCH) monitoring occasions (MOs) of a window duration for a multicast broadcast service (MBS), wherein a first SSB beam in a set of SSB beams is assigned to a first PDCCH MO of the window duration, a number of SSB beams in the set of SSB beams is greater than one, and a number of PDCCH MOs of the window duration is greater than one, wherein the window duration is a multicast control channel (MCCH) window duration or a multicast traffic channel (MTCH) window duration, and wherein the SSB beam mapping utilizes a periodicity of PDCCH MOs for the MTCH window duration, an offset of PDCCH MO for the MTCH window duration, and a number of PDCCH MOs of the MTCH window duration; and perform a transmission in a PDCCH MO specified by the SSB beam mapping.

2. The apparatus of claim 1, wherein the instructions, when executed by the at least one processor, cause the apparatus at least to:

receive assistance information from the one or more UEs, and wherein the determining of the SSB beam mapping utilizes the assistance information.

3. The apparatus of claim 1, wherein the SSB beam mapping comprises at least one of a first SSB beam mapping for a MCCH signal or a second SSB beam mapping for a MTCH signal, wherein the transmission is a first transmission, the PDCCH MO is a first PDCCH MO, and wherein the instructions, when executed by the at least one processor, cause the apparatus at least to: perform a second transmission in a second PDCCH MO specified by the second SSB beam mapping.

4. An apparatus, comprising:

at least one processor; and at least one memory storing instructions that, when executed by the at least one processor, cause the apparatus at least to:

receive a synchronization signal block (SSB) beam mapping for a multicast broadcast services (MBS) window; and process a transmission received from a communication node in a physical downlink control channel (PDCCH) monitoring occasion (MO) specified by the SSB beam mapping, which defines the SSB beam mapping to slots with configured PDCCH MOs of a window duration of the MBS window, wherein a first SSB beam in a set of SSB beams is assigned to a first PDCCH MO of the window duration, a number of SSB beams in the set of SSB beams is greater than one, and a number of PDCCH MOs in the window duration is greater than one, wherein the window duration is a multicast control channel (MCCH) window duration or a multicast traffic channel (MTCH) window duration, and wherein the SSB beam mapping is based on a periodicity of PDCCH MOs for the MTCH window duration, an offset of PDCCH MO for the MTCH window duration, and a number of PDCCH MOs of the MTCH window duration.

5. The apparatus of claim 4, wherein the instructions, when executed by the at least one processor, cause the apparatus at least to:

transmit assistance information to the communication node.

6. The apparatus of claim 4, wherein the SSB beam mapping comprises at least one of a first SSB beam mapping for a MCCH signal or a second SSB beam mapping for a MTCH signal, wherein the transmission is a first transmission, the PDCCH MO is a first PDCCH MO, and wherein the instructions, when executed by the at least one processor, cause the apparatus at least to: receive a second transmission from the communication node in a second PDCCH MO specified by the second SSB beam mapping.

7. A method, comprising:

receiving a synchronization signal block (SSB) beam mapping for an MBS window at a user equipment (UE); and processing a transmission received from a communication node in a physical downlink control channel (PDCCH) monitoring occasion (MO) specified by the SSB beam mapping, which defines the SSB beam mapping to slots with configured PDCCH MOs of a window duration of the MBS window, wherein a first SSB beam in a set of SSB beams is assigned to a first PDCCH MO of the window duration, a number of SSB beams in the set of SSB beams is greater than one, and a number of PDCCH MOs in the window duration is greater than one, wherein the window duration is a multicast control channel (MCCH) window duration or a multicast traffic channel (MTCH) window duration, and wherein the SSB beam mapping is based on a periodicity of PDCCH MOs for the MTCH window duration, an offset of PDCCH MO for the MTCH window duration, and a number of PDCCH MOs of the MTCH window duration.

8. The method of claim 7, further comprising:

transmitting assistance information to the communication node.

9. The method of claim 7, wherein the SSB beam mapping comprises at least one of a first SSB beam mapping for a MCCH signal or a second SSB beam mapping for a MTCH signal, wherein the transmission is a first transmission, the PDCCH MO is a first PDCCH MO, and wherein the method further comprises: receiving a second transmission from the communication node in a second PDCCH MO specified by the second SSB beam mapping.

10. A method, comprising:

receiving and transmitting communication signals with one or more user equipment (UE);

determining a synchronization signal block (SSB) beam mapping to slots with configured physical downlink control channel (PDCCH) monitoring occasions (MOs) of a window duration for a multicast broadcast service (MBS), wherein a first SSB beam in a set of SSB beams is assigned to a first PDCCH MO of the window duration, a number of SSB beams in the set of SSB beams is greater than one, and a number of PDCCH MOs of the window duration is greater than one, wherein the window duration is a multicast control channel (MCCH) window duration or a multicast traffic channel (MTCH) window duration, and wherein the SSB beam mapping utilizes a periodicity of PDCCH MOs for the MTCH window duration, an offset of PDCCH MO for the MTCH window duration, and a number of PDCCH MOs of the MTCH window duration; and performing a transmission in a PDCCH MO specified by the SSB beam mapping.

11. A non-transitory computer readable medium comprising instructions that, when executed by a processor, cause the processor to perform:

receiving a synchronization signal block (SSB) beam mapping for an MBS window at a user equipment (UE); and processing a transmission received from a communication node in a physical downlink control channel (PDCCH) monitoring occasion (MO) specified by the SSB beam mapping, which defines the SSB beam mapping to slots with configured PDCCH MOs of a window duration of the MBS window, wherein a first SSB beam in a set of SSB beams is assigned to a first PDCCH MO of the window duration, a number of SSB beams in the set of SSB beams is greater than one, and a number of PDCCH MOs in the window duration is greater than one, wherein the window duration is a multicast control channel (MCCH) window duration or a multicast traffic channel (MTCH) window duration, and wherein the SSB beam mapping is based on a periodicity of PDCCH MOs for the MTCH window duration, an offset of PDCCH MO for the MTCH window duration, and a number of PDCCH MOs of the MTCH window duration.

12. A non-transitory computer readable medium comprising instructions that, when executed by a processor, cause the processor to perform:

receiving and transmitting communication signals with one or more user equipment (UE);

determining a synchronization signal block (SSB) beam mapping to slots with configured physical downlink control channel (PDCCH) monitoring occasions (MOs) of a window duration for a multicast broadcast service (MBS), wherein a first SSB beam in a set of SSB beams is assigned to a first PDCCH MO of the window duration, a number of SSB beams in the set of SSB beams is greater than one, and a number of PDCCH MOs of the window duration is greater than one, wherein the window duration is a multicast control channel (MCCH) window duration or a multicast traffic channel (MTCH) window duration, and wherein the SSB beam mapping utilizes a periodicity of PDCCH MOs for the MTCH window duration, an offset of PDCCH MO for the MTCH window duration, and a number of PDCCH MOs of the MTCH window duration; and performing a transmission in a PDCCH MO specified by the SSB beam mapping.

* * * * *